United States Patent
Tsutsumida et al.

(10) Patent No.: US 7,182,306 B2
(45) Date of Patent: Feb. 27, 2007

(54) ENGINE MOUNT

(75) Inventors: Jyoji Tsutsumida, Komaki (JP); Noboru Arakawa, Nagoya (JP); Akihiro Mayama, Aikou-gun (JP); Kazushi Saikusa, Ebina (JP)

(73) Assignees: Tokai Rubber Industries, Ltd., Aichi (JP); Nissan Motor Co., Ltd., Kanagawa (JP)

( * ) Notice: Subject to any disclaimer, the term of this patent is extended or adjusted under 35 U.S.C. 154(b) by 124 days.

(21) Appl. No.: 11/050,735

(22) Filed: Feb. 7, 2005

(65) Prior Publication Data

US 2005/0178943 A1    Aug. 18, 2005

(30) Foreign Application Priority Data

Feb. 13, 2004   (JP)   ............................. 2004-036202

(51) Int. Cl.
- F16M 1/00    (2006.01)
- F16M 3/00    (2006.01)
- F16M 5/00    (2006.01)
- F16M 7/00    (2006.01)
- F16M 9/00    (2006.01)
- F16M 11/00   (2006.01)

(52) U.S. Cl. ...................... 248/638; 248/669; 248/674; 248/675; 248/609; 267/140.5

(58) Field of Classification Search ................ 248/562, 248/638, 669, 674, 675, 609; 267/140.11, 267/140.5
See application file for complete search history.

(56) References Cited

U.S. PATENT DOCUMENTS

| | | | | |
|---|---|---|---|---|
| 4,215,842 A | * | 8/1980 | Brenner et al. | 267/140.13 |
| 4,270,625 A | * | 6/1981 | Nishimura et al. | 180/291 |
| 4,392,639 A | * | 7/1983 | Konishi | 267/140.13 |
| 4,399,987 A | * | 8/1983 | Cucelli et al. | 267/140.13 |
| 4,573,656 A | * | 3/1986 | Yoshida et al. | 248/562 |
| 4,637,584 A | * | 1/1987 | Takehara | 248/559 |
| 4,638,983 A | * | 1/1987 | Idigkeit et al. | 267/140.14 |
| 4,641,808 A | * | 2/1987 | Flower | 267/140.14 |
| 4,650,170 A | * | 3/1987 | Fukushima | 267/140.14 |

(Continued)

FOREIGN PATENT DOCUMENTS

GB    1 550 922    8/1976

(Continued)

*Primary Examiner*—Carl D. Friedman
*Assistant Examiner*—Michael McDuffie
(74) *Attorney, Agent, or Firm*—Oliff & Berridge, PLC

(57) ABSTRACT

An engine mount including a rubber elastic body connecting an upper and lower mounting plate fixture and a rebound stopper mechanism having an upper stopper integrally formed with an upper mounting plate fixture and a lower stopper integrally formed with a lower mounting plate fixture. The upper stopper is bolted to a power unit at a position deviating more toward the inside of the power unit than a position of an elastic main axis of the rubber elastic body on the upper mounting plate fixture so that the stopper mechanism in the rebound direction is positioned generally vertically below the position where the upper stopper is bolted to the power unit, whereas the lower stopper is bolted to the vehicle body at a position deviating more toward the inside of the power unit than the position of the elastic main axis of the rubber elastic body on the lower fixture.

8 Claims, 6 Drawing Sheets

U.S. PATENT DOCUMENTS

| | | | |
|---|---|---|---|
| 4,657,219 A * | 4/1987 | Kakimoto | 248/562 |
| 4,673,156 A * | 6/1987 | Tabata | 267/140.13 |
| 4,709,898 A * | 12/1987 | Yoshida et al. | 267/140.13 |
| 4,787,610 A * | 11/1988 | Kojima et al. | 267/140.13 |
| 4,856,750 A * | 8/1989 | Le Fol | 248/562 |
| 4,987,679 A * | 1/1991 | Rau | 29/897.2 |
| 5,031,873 A * | 7/1991 | Rau | 248/632 |
| 5,078,369 A * | 1/1992 | Pascal et al. | 267/140.13 |
| 5,127,636 A * | 7/1992 | Spaltofski | 267/140.13 |
| 5,180,148 A * | 1/1993 | Muramatsu | 267/140.14 |
| 5,242,146 A * | 9/1993 | Tecco et al. | 248/638 |
| 5,407,169 A * | 4/1995 | Tournier | 267/140.11 |
| 5,413,320 A * | 5/1995 | Herbst | 267/140.13 |
| 5,427,347 A * | 6/1995 | Swanson et al. | 267/140.14 |
| 5,433,421 A * | 7/1995 | Ishiyama | 267/140.13 |
| 5,460,238 A * | 10/1995 | Burke et al. | 180/299 |
| 5,687,948 A * | 11/1997 | Whiteford et al. | 248/635 |
| 5,691,037 A * | 11/1997 | McCutcheon et al. | 428/172 |
| 5,799,923 A * | 9/1998 | Carr et al. | 248/635 |
| 5,944,297 A * | 8/1999 | Flower et al. | 248/638 |
| 5,979,883 A * | 11/1999 | Mizutani et al. | 267/140.13 |
| 6,045,328 A * | 4/2000 | Jones | 416/140 |
| 6,056,279 A * | 5/2000 | Lee et al. | 267/140.13 |
| 6,129,328 A * | 10/2000 | Knurek et al. | 248/638 |
| 6,189,874 B1 * | 2/2001 | Carlson | 267/141 |
| 6,270,051 B1 * | 8/2001 | Power | 248/638 |
| 6,349,918 B1 * | 2/2002 | Bunker | 248/635 |
| 6,450,473 B1 * | 9/2002 | Kondo et al. | 248/560 |
| 6,450,474 B1 * | 9/2002 | Bucksbee | 248/638 |
| 6,511,059 B2 * | 1/2003 | Seynaeve | 267/140.13 |
| 6,550,558 B2 * | 4/2003 | Yorwarth et al. | 180/68.4 |
| 2001/0017341 A1 * | 8/2001 | Gennesseaux | 248/550 |
| 2001/0019099 A1 * | 9/2001 | Okanaka et al. | 248/562 |
| 2001/0032919 A1 * | 10/2001 | Hagino et al. | 248/562 |
| 2002/0047080 A1 * | 4/2002 | Guillemot | 248/562 |
| 2002/0109066 A1 * | 8/2002 | Baudendistel et al. | 248/562 |

FOREIGN PATENT DOCUMENTS

| | | |
|---|---|---|
| JP | A 59 183142 | 10/1984 |
| JP | 7-89356 | 4/1995 |
| JP | 2000-238542 | 9/2000 |
| JP | 2001-65628 | 3/2001 |
| JP | 2001-165242 | 6/2001 |
| JP | 2002-295587 | 10/2002 |
| JP | 2003-056642 | 2/2003 |

* cited by examiner

ENGINE MOUNT

INCORPORATED BY REFERENCE

The disclosure of Japanese Patent Application No. 2004-036202 filed on Feb. 13, 2004 including the specification, drawings and abstract is incorporated herein by reference in its entirety.

BACKGROUND OF THE INVENTION

1. Field of the Invention

The present invention relates to an engine mount that is installed between a power unit and vehicle body to provide vibration isolating support of the power unit against the vehicle body, and more particular to an engine mount with a novel structure comprising a stopper mechanism to limit an amount of relative displacement of the power unit against the vehicle body in a cushion-wise fashion.

2. Description of the Related Art

A plurality of engine mounts have conventionally been installed between automobile vehicle bodies and their power units to allow the power units to be supported in a vibration-damping fashion relative to the vehicle bodies. Such engine mounts are generally composed of an upper mounting fixture and a lower mounting fixture which are disposed apart from each other and joined by a rubber elastic body. As disclosed in JP-A-7-89356, for example, they are set up at the bottom on either side of the torque roll axis of the power unit to support the power unit from below on both sides in the lateral direction.

The spring properties of the engine mounts should be relaxed enough to achieve good vibration damping when such engine mounts are used for the vibration-damping support mechanisms for power units in relation to vehicle bodies. However, it is necessary to control significant displacement of the power unit relative to the vehicle body in instances of substantial vibration load. A stopper mechanism for cushioning relative displacement has thus often been provided on the upper and lower mounting fixtures attached to either the vehicle body or power unit in conventional engine mounts.

Such stopper mechanisms are generally constructed by forming contact protrusions that protrude outward from the upper and lower mounting fixtures toward each other, with the contact protrusions disposed apart at a certain interval in the vibration input direction on either side of cushioning rubber.

However, the pair of engine mounts mounted so as to support the power unit at an incline from below on either side of the axis as described above have suffered from the following avoidable problem. Namely, because of the required power unit support properties, as noted in the aforesaid JP-A-7-89356, the mount center axis, which is the elastic main axis extending in the direction in which the upper and lower mounting fixtures face each other, is tilted upward on the inside of the power unit. Therefore, the point of contact at the contact protrusions forming the stopper mechanism is considerably outside the horizontal direction from the upper or lower mounting fixtures.

That is, when the stopper mechanism is formed by the protruding formation of the contact protrusions slanting inwardly from the upper and lower mounting fixtures as indicated in FIGS. 5 and 6 of JP-A-7-89356, the result is a greater distance in the horizontal direction from the point where the lower mounting fixture is fixed to the vehicle body to the point of contact of the contact protrusions. When vertical stopper load is exerted on the contact protrusions, substantial moment acts on the point where the lower mounting fixture is fixed to the vehicle body, making it difficult to obtain satisfactory strength or withstand load capability. When, on the other hand, the stopper is formed by the protruding formation of contact protrusions slanting outwardly from the upper and lower mounting fixtures as indicated in FIGS. 1 and 2 in JP-A-7-89356, the result is a greater distance in the horizontal direction from the point where the upper mounting fixture is fixed to the power unit to the point of contact of the contact protrusions. When vertical stopper load is exerted on the contact protrusions, substantial moment acts on the point where the upper mounting fixture is fixed to the power unit, making it difficult to obtain satisfactory strength or withstand load capability.

In the stopper mechanism for the power unit shown in either FIGS. 1 and 2 or 5 and 6 in JP-A-7-89356, the contact protrusion of the upper mounting fixture that is fixed to the power unit is in the shape of a large pocket which not only is wrapped around so that the contact protrusion on the lower mounting fixture is encompassed outwardly from below, but the walls are integrally formed on both the left and right sides. The resulting increase in the mass of the upper mounting fixture results in a lower natural frequency, with the risk of worsening vibration as a result of resonance in the upper mounting fixture in the low frequency range which tends to cause problems in preventing vehicle vibration.

SUMMARY OF THE INVENTION

It is therefore one object of this invention to provide an engine mount of novel structure capable of providing a stopper mechanism for limiting an amount of relative displacement of the power unit against the vehicle body, while assuring its high withstand load capability with efficiency.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the present invention provides an engine mount comprising: An engine mount comprising: (a) an upper mounting plate fixture fixable to a power unit; (b) a lower mounting plate fixture disposed facing to the upper mounting plate fixture at a distance from each other, and fixable to a vehicle body; (c) a rubber elastic body disposed between and elastically connecting the upper and lower mounting plate fixtures, (d) the engine mount adapted to be disposed on either side of a torque roll axis of the power unit with the upper and lower mounting plate fixtures respectively fixed to the power unit and vehicle body so that an elastic main axis of the rubber elastic body is disposed at an incline slanting upward toward an inside of the power unit; (e) an upper stopper formed by being integrally formed with the upper mounting plate fixture or by fixing a separate fixture to the upper mounting plate fixture such that a downward facing protrusion is provided protruding downward on a side of the power unit from the upper mounting plate fixture, and a distal end of the downward facing protrusion is bent into an L-shape, so as to provide a first contact component extending generally horizontally toward the rubber elastic body; (f) a lower stopper formed by being integrally formed with the lower mounting plate fixture or by fixing a separate fixture to the lower mounting plate fixture such that an upward facing protrusion is provided protruding upward on the side of the power unit from the lower mounting plate fixture, and a distal end of the upward facing protrusion is bent into an L-shape, so as to provide a second contact component extending generally horizontally toward a side opposite the rubber elastic body, whereby the first contact component is thrust into the bottom of the second contact component so that the first and second contact components are positioned facing each other at a distance from each other generally in a vertical direction; and (g) a cushioning rubber formed on at least one of the first and second contact components to form a stopper mechanism in a rebound direction, wherein the upper stopper is bolted to the power unit at a position deviating more toward the inside of the power unit than a position of the elastic main axis of the rubber elastic body on the upper mounting plate fixture so that the stopper mechanism in the rebound direction is positioned generally vertically below the position where the upper stopper is bolted to the power unit, and wherein the lower stopper is bolted to the vehicle body at a position deviating more toward the inside of the power unit than the position of the elastic main axis of the rubber elastic body on the lower mounting plate fixture.

In engine mounts constructed according to this mode, the stopper mechanism in the rebound direction is positioned generally vertically below the position where the upper stopper is bolted to the power unit. When the stopper mechanism in the rebound direction is activated, the position where the upper stopper is bolted to the power unit is located on the line of action of the force of contact in the rebound direction between the first and second contact components. With this arrangement, the moment produced relative to the bolt fixing position of the upper stopper as a result of the contact force in the rebound direction is thus effectively suppressed, ensuring better withstand load capability in the bolt fixing position and the stopper mechanism.

In this mode, moreover, the lower stopper is bolted to the vehicle body at a position deviating more toward the inside of the power unit than the position of the elastic main axis of the rubber elastic body on the lower mounting plate fixture. With this arrangement, the contact force between the first and second contact components when the stopper mechanism is activated is efficiently transmitted from the lower stopper to the vehicle body, with more attenuated moment acting on the areas where the lower stopper is fixed to the vehicle body, as well as greater support strength of the lower stopper by the vehicle body and more advantageous withstand load capability in the lower stopper. Meant by the elastic main axis in this mode is the elastic main axis of the mount extending generally facing the upper and lower mounting plate fixtures.

The engine mount of this mode therefore ensures better withstand load capability at the positions where the lower stopper is fixed to the vehicle body as well as in the positions where the upper stopper is bolted to the power unit, allowing a greater withstand load capability to be effectively achieved in the stopper mechanisms.

In this mode, the upper stopper and lower stopper are fixed to the power unit and vehicle body, respectively at positions near the first and second contact components, resulting in greater support rigidity in the upper and lower stoppers. This makes it possible to set the natural frequency of the upper and lower stoppers or the upper and lower mounting plate fixtures to a sufficiently high frequency band, to thereby attenuate or avoid any worsening vibration as a result of resonance and thus achieve better vibration damping performance.

A second mode of the invention provides an engine mount according to the aforesaid first mode, wherein the upward facing protrusion in the lower stopper is bent toward the inside of the power unit on both sides in a widthwise direction of the first contact component in the upper stopper, so as to integrally form vertical walls joining the upward facing protrusion in the lower stopper with both edges of the second contact component in a widthwise direction, providing a generally pocket-shaped structure opening downward formed overall by the upward facing protrusion, second contact component, and the vertical walls on the both sides.

In this mode, the lower stopper is generally in the form of a pocket or pouch comprising the second contact component and the upward facing protrusion, allowing the rigidity of the lower stopper to be improved and, as a result, the withstand load capability of the stopper mechanism to be even more advantageously improved. In this mode in particular, the pocket structure is formed by the lower stopper fixed to the vehicle body, which is subject to vibration, not the upper stopper fixed direction to the power unit, which is the source of the vibration. It is thus possible to suppress worsening vibration caused by a decrease in the natural frequency with increased weight.

A third mode of the invention is an engine mount according to the aforesaid first or second mode, wherein the second contact component in the lower stopper is located in a position apart from and facing a surface of the downward facing protrusion of the upper stopper on a side of the rubber elastic body, at a protruding end surface thereof, and a cushioning rubber is formed on at least one of the surfaces facing each other, forming a lateral stopper mechanism; and the second contact component in the lower stopper protrudes toward the side opposite the rubber elastic body on both sides in the later direction of the downward facing protrusion in the upper stopper, integrally forming a pair of contact components in the widthwise direction located apart from and facing outward in the widthwise direction relative to both end surfaces in the widthwise direction of the downward facing protrusion in the upper stopper, a cushioning rubber being formed on at least one of the facing surfaces so as to form a stopper mechanism in the widthwise direction.

In this mode, the protruding distal end component (surface) of the second contact component and a component (surface) of the downward facing protrusion on the rubber elastic body side are used to provide a stopper mechanism in the lateral direction, making it possible to produce a stopper mechanism, without increasing special parts, in which the relative displacement of the power unit in the axis-perpendicular direction to the vehicle body is limited in a cushion-wise fashion, in the horizontal direction orthogonal to the power unit torque roll axis by means of the left and right pair of engine mounts.

The stopper mechanism in the widthwise direction formed in this mode also comprises widthwise contact components integrally formed with the second contact component and both ends in the widthwise direction of the downward facing protrusion, making it possible to produce a stopper mechanism, without increasing special parts, in which the relative displacement of the power unit in the axial direction relative to the vehicle body, is limited in a cushion-wise fashion in the horizontal direction generally along the torque roll axis of the power unit.

That is, in this mode, the lateral stopper mechanism and widthwise stopper mechanism can involve the combined use of the second contact component and downward facing protrusion, in addition to which the rebound stopper mechanism in the first mode of the invention comprises the second contact component and downward facing protrusion equipped with the first contact component. With this arrangement, stopper mechanisms corresponding to each vibrating direction can be obtained with a simpler and more compact structure.

A fourth mode of the invention is an engine mount according to any one of the aforesaid first through third modes, wherein a third contact component is formed in the upper mounting plate fixture at a distance facing, from above, the second contact component in the lower stopper, and a cushioning rubber is formed on at least one facing surface of the second contact component or third contact component, forming a stopper mechanism in a bound direction.

In this mode, a stopper mechanism that cushions the relative displacement of the power unit in the bound direction of the power unit relative to the vehicle body comprises the second contact component that is also used in the rebound stopper mechanism, resulting in easier manufacture with fewer components.

In addition, the stopper mechanism in the bound direction, which comprises the second contact component and the third contact component positioned apart from and facing, from above, the second contact component, is positioned facing in generally the direction vertical to the bound stopper mechanism on both sides of the second contact component so that it is vertically below the position where the upper stopper is bolted to the power unit. Moment around the bolt fixing position is thus suppressed in the same manner as with the rebound stopper mechanism when the second and third contact components come into contact with each other, affording better withstand load capability.

In this mode, the bound direction refers to the downward vertical direction, which is where the weight of the power unit acts on the vehicle body. The third contact component may be integrally formed by curving or bending the upper mounting plate fixture, for example, but may also be formed by securing a separate fixture to the upper mounting plate fixture by welding or the like.

The cushioning rubber used in the above stopper mechanisms in the rebound, lateral, or widthwise directions or the like in the engine mount in this mode is integrally deposited on the downward facing protrusion comprising the first contact component in the upper stopper. This makes manufacturing easier.

A fifth mode of the invention is an engine mount according to any one of the aforesaid first through fourth modes, wherein the upper mounting plate fixture is extended toward the inside of the power unit so that the upper stopper is integrally formed with the upper mounting plate fixture; the bolt fixing the upper mounting plate fixture to the power unit is set up deviating more toward the inside of the power unit than the elastic main axis of the rubber elastic body, whereas the lower stopper is formed by bolting a separate fixture to the lower mounting plate fixture; and the lower stopper is bolted to the vehicle body at a location nearer the second contact component than the position where the lower mounting plate fixture is bolted in the lower stopper.

In this mode, the positions where the upper stopper is bolted to the power unit and the lower stopper is bolted to the vehicle body can be even closer to the rebound stopper mechanism. This will more effectively suppress moment produced where the upper and lower stoppers are bolted, affording even better withstand load in the upper and lower stoppers.

A sixth mode of the invention is an engine mount according to any one of the aforesaid first through fifth modes, wherein the lower stopper is bolted at a plurality portions to the vehicle body and the plurality of portions are on both sides of the second contact component in the widthwise direction.

In this mode, greater bolting strength to the vehicle body is achieved at the second contact component formed on the lower stopper, affording even better rigidity and withstand load capability in the lower stopper.

In the sixth mode, the shape, size, number, or the like of the position where the lower stopper is bolted to the vehicle body are not limited. One or more bolting positions may be provided on both sides of the second contact component.

A seventh mode of the invention is an engine mount according to the aforesaid sixth mode, wherein the positions where the lower stopper is bolted to the vehicle body are disposed on generally a same line in the widthwise direction of the second contact component.

In this mode, the position where the lower stopper is bolted to the vehicle body is suitably closer to the rebound stopper mechanism. When load is exerted in the rebound direction, for example, the load input at the bolt positions is efficiently distributed, resulting in even better withstand load.

In this mode, at least two bolt fixing positions, for example, may be provided on either side of the second contact component on a line extending in the widthwise direction of the second contact component, that is, may be disposed on generally the same line in the widthwise direction as the second contact component, or a suitable number of bolting positions may be provided on both sides in the widthwise direction of the second contact component on generally the same line in the widthwise direction as the second contact component. A plurality of lines extending in the widthwise direction of the second contact component can also be provided separately at right angles to the widthwise direction, so that a suitable number of bolt fixing positions are disposed on a plurality of lines.

As will be evident from the preceding description, the engine mount of construction according to the present invention is able to provide stopper mechanisms limiting relative displacement between the upper and lower stoppers in the rebound direction wherein the action of moment at the positions where the power unit and vehicle body are fixed can be effectively suppressed, thereby ensuring better withstand load capability.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
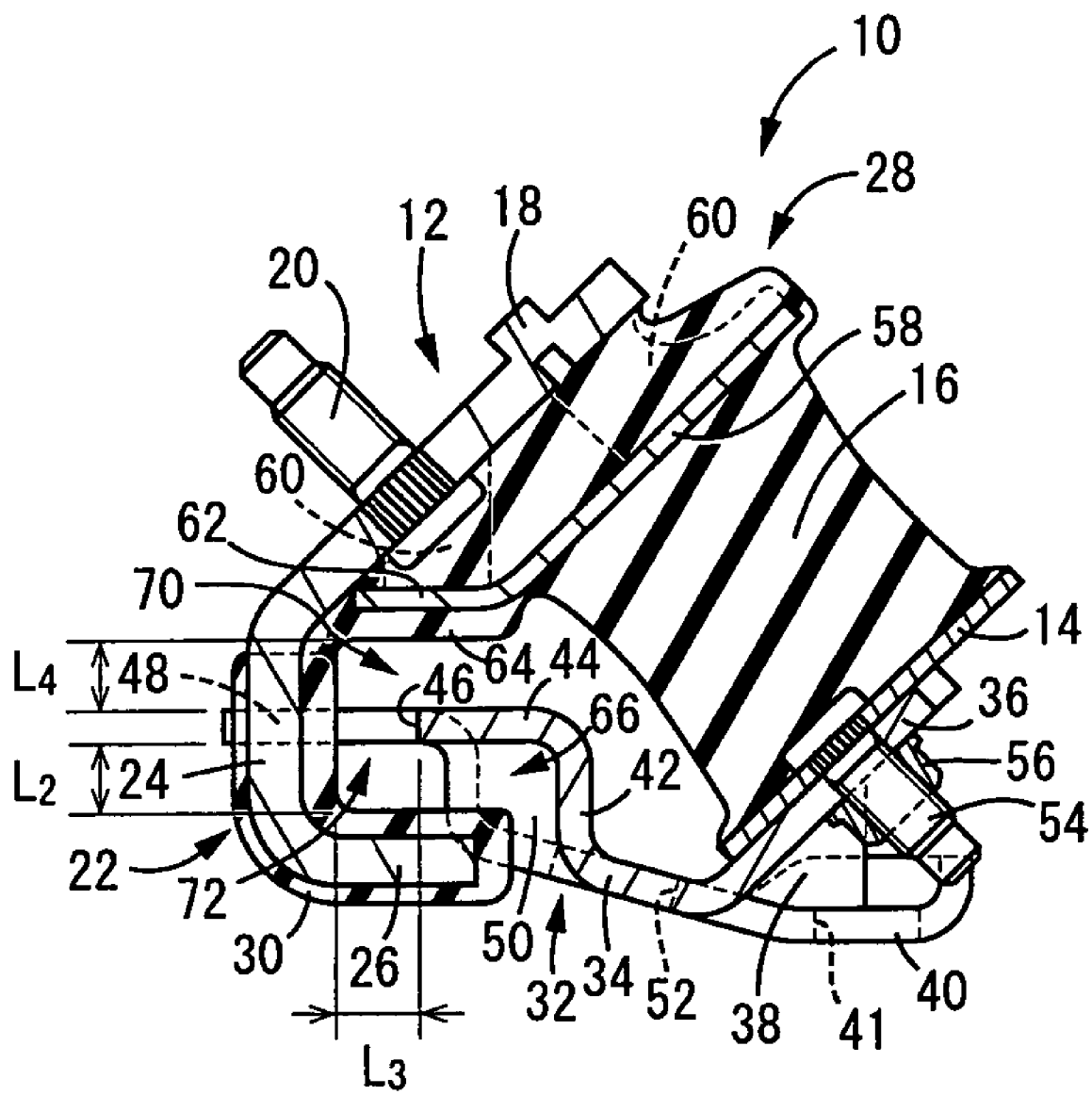
FIG. 1 is an elevational view in vertical cross section of an engine mount according to a first embodiment of the present invention, which is mounted on an automotive vehicle.
Figure 2:
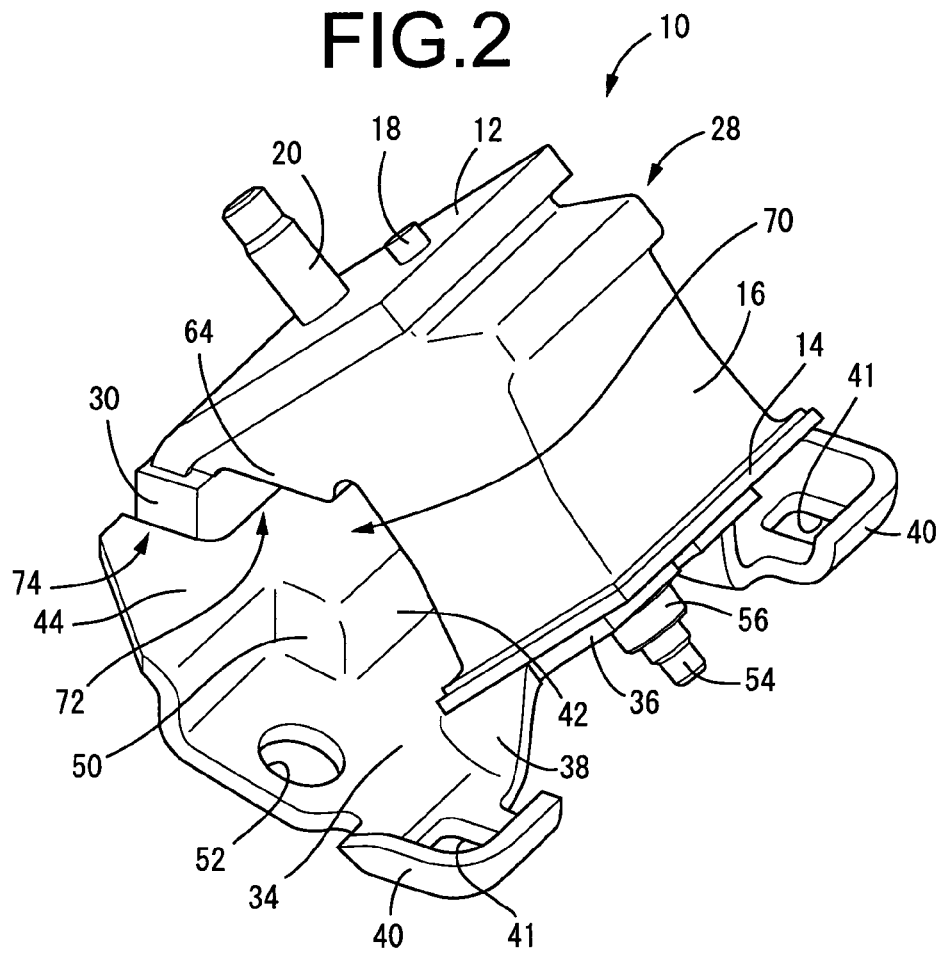
FIG. 2 is a perspective schematic view of the engine mount of FIG. 1 as seen from a diagonally upper portion.
Figure 3:
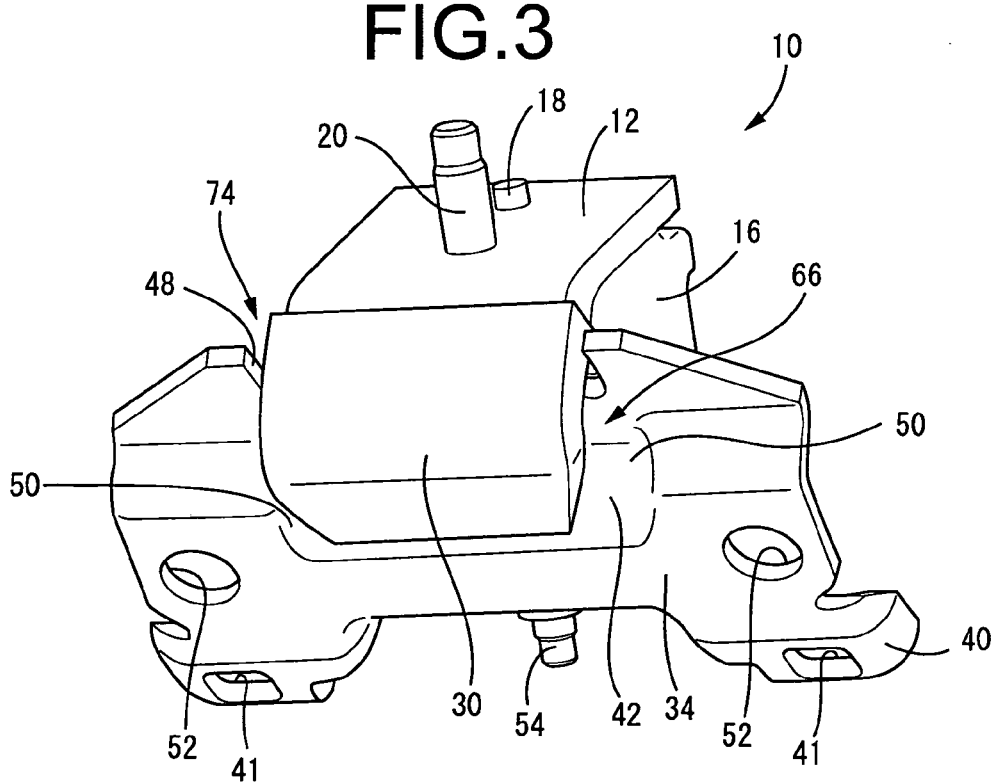
FIG. 3 is a perspective schematic view of the engine mount of FIG. 1 as seen from a diagonally lower portion.

Embodiments of the invention will be described in order to provide a further understanding of the invention. FIGS. 1 through 3 illustrate an engine mount 10 as an embodiment of the invention. In the structure of the engine mount 10, an upper fixture 12 serving as the upper mounting plate fixture and a lower fixture 14 serving as the lower mounting plate fixture are disposed at a certain distance from each other, and are joined together by a rubber elastic body 16. In the following description, the vertical direction as a rule refers to the up and down or vertical direction in FIG. 1.

More specifically, the upper fixture 12 is in the form of a thick, generally rectangular flat plate, and is tilted at a certain angle of incline relative to the horizontal direction (left and right in FIG. 1). A protrusion 18 with a generally columnar shape of small diameter is provided at one end surface in the thicknesswise direction (left upward slant in FIG. 1) near one end in the widthwise direction (right upward slant in FIG. 1) of the upper fixture 12. In addition, a fixing bolt 20 integrally formed in a protruding manner near the other end in the widthwise direction (left downward slant in FIG. 1) at the same end surface. In other words, the fixing bolt 20 is provided facing inward in the direction in which the upper fixture 12 is inclined (left in FIG. 1).

An upper stopper 22 is also integrally formed at the other end in the widthwise direction (left downward slant in FIG. 1) of the upper fixture 12. The upper stopper 22 has a generally L-shaped cross section, and comprises a downward facing protrusion 24 and a first contact component 26. The downward facing protrusion 24 is in the form of a generally rectangular flat plate extending a certain length vertically downward (downward in FIG. 1) from the bottom end edge of the upper fixture 12. The downward distal end of the downward facing protrusion 24 is bent inwardly to form the shape of an L, whereby the first contact component 26 is integrally formed with the distal end of the downward facing protrusion 24. The first contact component 26 is in the form of a generally rectangular flat plate, and extends generally horizontally to one side in the horizontal direction (right in FIG. 1). In this embodiment in particular, the first contact component 26 is located generally vertically below the fixing bolt 20 in the upper fixture 12.

The lower fixture 14 is disposed a certain distance apart from the upper fixture 12. The lower fixture 14 is in the form of a generally rectangular flat plate, and is tilted at generally the same angle of incline as the upper fixture 12 relative to the horizontal direction (left and right in FIG. 1). The upper fixture 12 and lower fixture 14 are thus inclined in the same direction (right slanting direction in FIG. 1), so that they face each other at a distance apart from each other in the direction orthogonal to the incline direction (left slanting direction in FIG. 1).

Figure 4:
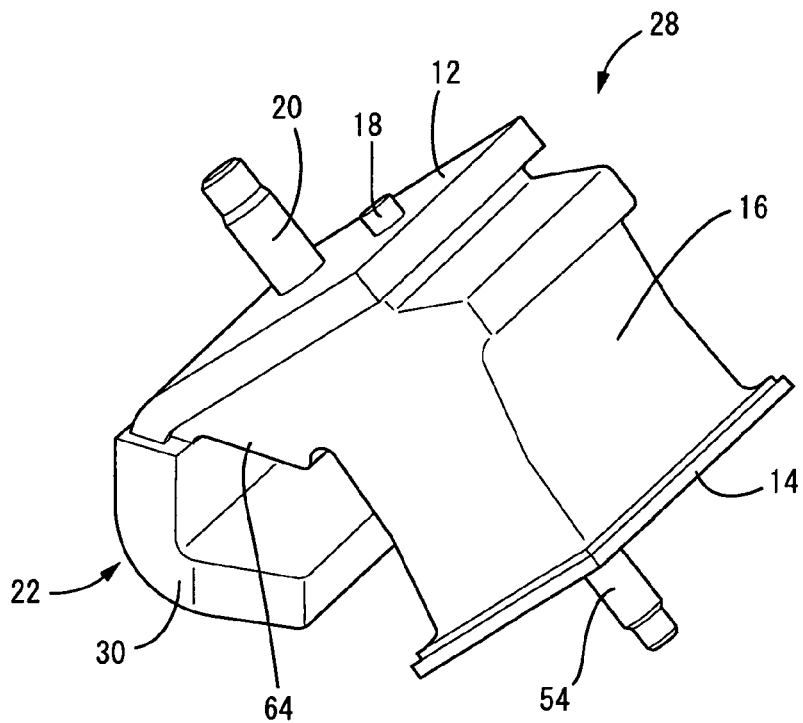
FIG. 4 is a perspective schematic view of an integrally vulcanized product of the engine mount of FIG. 1 as seen from a diagonally upper portion.

The rubber elastic body 16 is disposed in the plane between the upper fixture 12 and lower fixture 14 facing each other. The rubber elastic body 16 is in the form of a generally rectangular block, where one end surface in the axial direction is bonded by vulcanization to the surface of the upper fixture 12 facing the lower fixture 14, and the other end surface in the axial direction is bonded by vulcanization to the surface of the lower fixture 14 facing the upper fixture 12. Thus, as illustrated in FIG. 4, the rubber elastic body 16 is in the form of an integrally vulcanized product 28 equipped with an upper fixture 12 or lower fixture 14. In this embodiment in particular, the center axis extending in the longitudinal direction (left slanting direction in FIG. 1) of the rubber elastic body 16 extends generally parallel to the direction in which the two fixtures 12 and 14 face each other, so that the rubber elastic body 16 is disposed at a certain angle of incline from the lower fixture 14 toward the upper fixture 12. It will thus be evident that the first contact component 26 integrally formed with the L-shaped distal end of the downward facing component 24 extends generally parallel toward the rubber elastic body 16.

A cushioning rubber layer 30 is also deposited on the upper stopper 22 consisting of the downward facing protrusion 24 and the first contact component 26. The cushioning rubber layer 30 is integrally formed with the rubber elastic body 16, and is deposited to a uniform thickness along generally the entire upper stopper 22.

Figure 5:
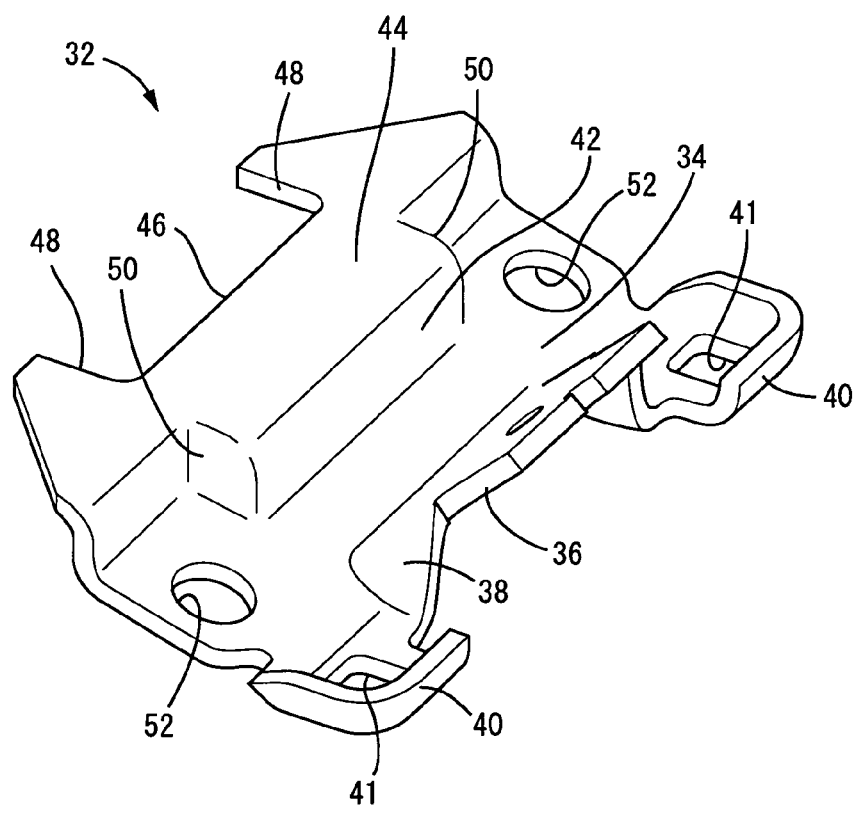
FIG. 5 is a perspective schematic view of a lower bracket of the engine mount of FIG. 1 as seen from a diagonally upper portion.

A lower bracket 32 is attached as a separate fixture forming the lower stopper to the lower fixture 14. As illustrated in FIG. 5, the lower bracket 32 comprises a floor wall 34 which is generally rectangular when viewed flat. A fixing plate 36 is also integrally formed at one end in the lateral widthwise direction (right downward slanting direction in FIG. 5) of the floor wall 34. The fixing plate 36 is in the form of a generally rectangular plate, and rises upward at a certain angle of inclination from the floor wall 34, both edges in the widthwise direction being integrally formed with the center in the widthwise direction of the floor wall 34 via side walls 38 and 38 which are generally triangular when viewed from the side. On either side in the widthwise direction (right slanting direction in FIG. 5) of the fixing plate 36 in the floor wall 34, there are formed a pair of supports 40 and 40 facing each other at a certain distance apart from each other in the outward widthwise direction relative to the side walls 38. Each support 40 is in the form of generally rectangular flat plates with ribs integrally formed at the outer peripheral edges, and have a positioning hole 41, that is generally rectangular when viewed flat, in the center.

A lower bracket 32 is attached as a separate fixture forming the lower stopper to the lower fixture 14. As illustrated in FIG. 5, the lower bracket 32 comprises a floor wall 34 which is generally rectangular when viewed flat. A fixing plate 36 is also integrally formed at one end in the lateral widthwise direction (right downward slanting direction in FIG. 5) of the floor wall 34. The fixing plate 36 is in the form of a generally rectangular plate, and rises upward at a certain angle of inclination from view for wall 34, both edges in the widthwise direction being integrally formed with the center in the widthwise direction of the floor wall 34 via side walls 38 and 38 which are generally triangular when viewed from the side. On either side in the widthwise direction (right slanting direction in FIG. 5) of the fixing plate 36 in the floor wall 34 are formed a pair of supports 40 and 40 facing each other at a certain distance apart from each other in the outward widthwise direction relative to the side walls 38. The supports 40 are in the form of generally rectangular flat plates with ribs integrally formed at the outer peripheral edges, and have a positioning hole 41, that is generally rectangular when viewed flat, in the center.

An upward facing protrusion 42 is also integrally formed at the other end in the lateral widthwise direction (left upward slanting direction in FIG. 5) of the floor wall 34. The upward facing protrusion 42 is in the form of a generally rectangular flat plate extending a certain length along the widthwise direction in the center in the widthwise direction (right slanting direction in FIG. 5) of the floor wall 34, and protrudes upward at a certain angle of inclination relative to the floor wall 34. The upward distal end of the upward facing protrusion 42 is bent to form the shape of an L, whereby a second contact component 44 is integrally formed with the distal end of the upward facing protrusion 42. The second contact component 44 is in the form of a generally rectangular flat plate, and extends horizontally in the direction orthogonal to the upward facing protrusion 42.

Both ends in the widthwise direction (right slanting direction in FIG. 5) of the second contact component 44 also protrude a certain length in the outward protruding direction past the protruding end 46 provided at the distal end in the protruding direction (left slanting direction in FIG. 5) of the second contact component 44. Widthwise contact components 48 extending a certain length from the protruding end 46 toward the outward protruding direction are thus integrally provided on both sides in the widthwise direction of the protruding end 46. In other words, the center of one end in the lateral widthwise direction (left upward slant in FIG. 5) in the second contact component 44 is opened in a concave form toward the outward protruding direction by means of the protruding end 46 and the pair of widthwise contact components 48 and 48.

Integrally formed at both ends in the widthwise direction of the upward facing protrusion 42 are vertical walls 50 such that the two ends extend outward along the plane between the second contact component 44 and the floor wall 34 facing each other. The floor wall 34, upward facing protrusion 42, and second contact component 44 are thus connected by the pair of vertical walls 50 and 50, while the upward facing protrusion 42, second contact component 44, and pair of vertical walls 50 and 50 form a generally pocket-shaped structure overall that opens downward.

Fixing holes 52 are also provided as bolt fixing positions on both sides in the widthwise direction of the second contact component 44 in the floor wall 34 of the lower bracket 32.

A retainer fixture 58 is also embedded in the integrally vulcanized product 28. The retainer fixture 58 is in the form of a generally rectangular flat plate, and is tilted at a certain distance so as to extend generally parallel to the upper fixture 12 in the plane between the upper fixture 12 and lower fixture 14 facing each other. The retainer fixture 58 is also fixed by means of bonding or the like to the upper fixture 12 via a plurality of bonding tabs 60 extending in the direction in which the upper fixture 12 and retainer fixture 58 face each other. The retainer 58 is integrally formed by vulcanization molding with the rubber elastic body 16 along with the upper fixture 12 or lower fixture 14 so as to be embedded in the rubber elastic body 16 in the integrally vulcanized product 28.

In this embodiment, the end at the bottom in the direction in which the retainer fixture 58 is tilted (left downward slant in FIG. 1) is bent in the generally parallel extending direction (left and right in FIG. 1), and a third contact component 62 is integrally formed with the end. The third contact component 62 is in the form of a generally rectangular flat plate, and is formed so as to spread out in the generally horizontal direction. The third contact component 62 is interposed extending generally parallel to the first contact component 26 in the plane between the fixing bolt 20 in the upper fixture 12 and the first contact component 26 in the upper stopper 22 facing each other. In other words, the third contact component 62 is positioned generally vertically under the fixing position of the fixing bolt 20 in the upper fixture 12. A cushioning rubber 64 integrally formed with the rubber elastic body 16 is deposited in the plane where the third contact component 62 faces the first contact component 26.

The fixing plate 36 of the lower bracket 32 is closely placed on and securely fixed to the lower fixture 14 of the integrally vulcanized molded product 28, by screwing a fixing nut 56 onto an mounting bolt 54 that is fixed to generally the middle of the lower fixture 14 and extending through the fixing plate 36. The engine mount 10 is thus constructed. The pair of fixing holes 52, 52 have also been provided on both sides in the widthwise direction of the second contact component 44 in the floor wall 34 of the lower bracket 32, allowing the lower bracket 32 to be positioned nearer to the second contact component 44 than the mounting bolt 54 fixed to the lower fixture 14.

Figure 6:
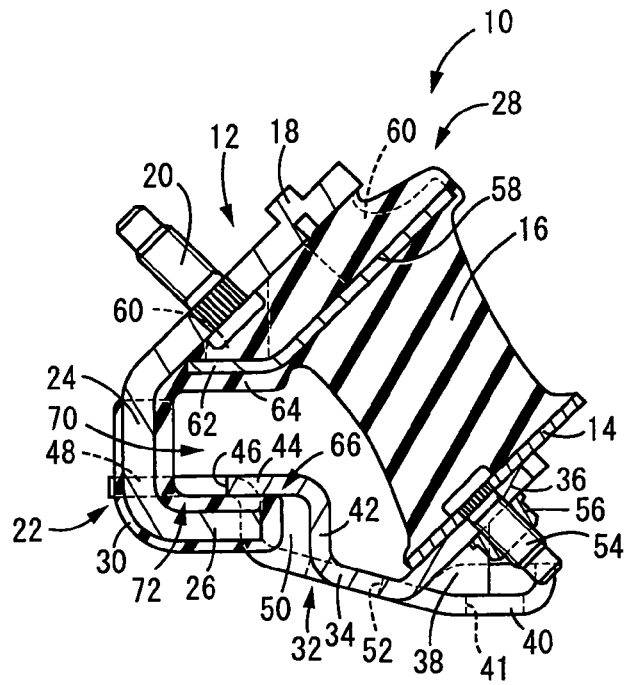
FIG. 6 is an elevational view in vertical cross section of the engine mount of FIG. 1 in a state prior to being mounted on the vehicle, taken along line 6—6 of FIG. 7.
Figure 7:
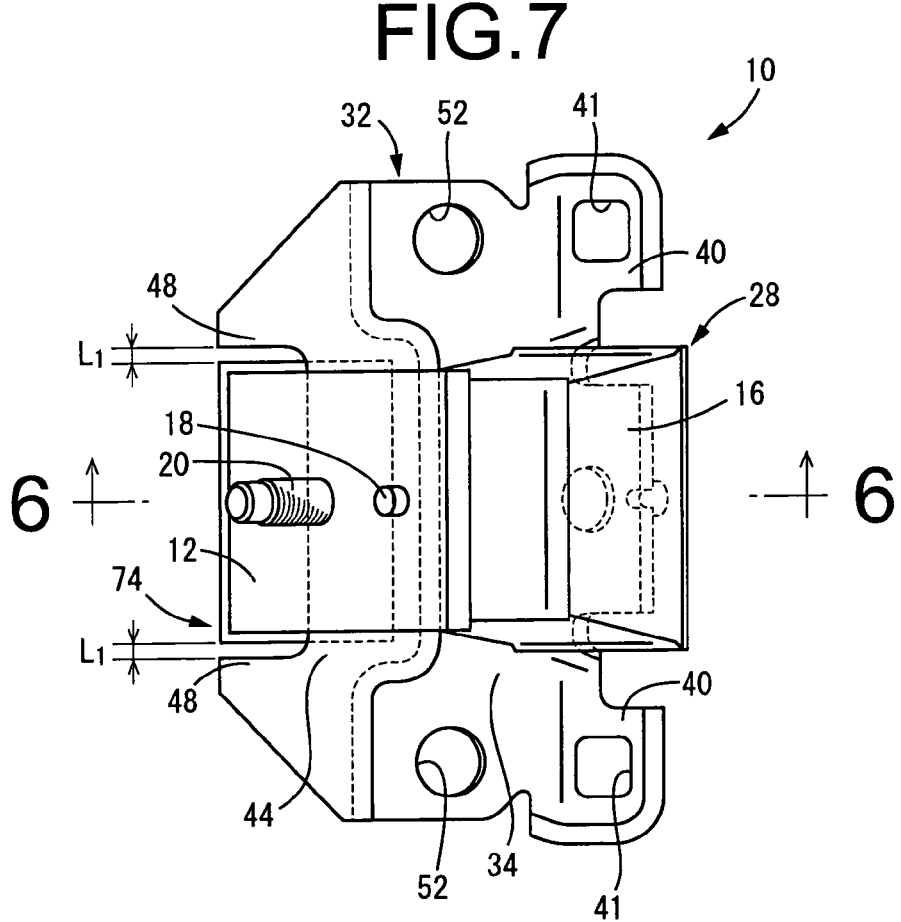
FIG. 7 is a top plane view of the engine mount of FIG. 6.

In this engine mount 10 in particular, the downward facing protrusion 24 of the upper stopper 22 is between the pair of widthwise direction contact components 48, 48 in the lower bracket 32, and the first contact component 26 in the upper stopper 22 is located at a certain distance below the second contact component 44 of the lower bracket 32 via the cushioning rubber layer 30 deposited on the first contact component 26. That is, the first contact component 26 and second contact component 44 are positioned facing each other at a certain distance from each other in the vertical direction. Thus, a stopper mechanisms 66 in the rebound direction consisting of the first contact component 26, second contact component 44, and cushioning rubber layer 30 is thus provided in the engine mount 10. FIGS. 6 and 7 show that part of the cushioning rubber layer 30 is in contact with the second contact component 44 before the engine mount 10 is mounted on a vehicle, that is, when the static load of a power unit 68 described below is not being applied.

The second contact component 44 of the lower bracket 32 and the third contact component 62 of the retainer fixture 58 are positioned facing each other apart from each other in the vertical direction via the cushioning rubber 64 deposited on the third contact component 62. Thus, a stopper mechanism 70 in the bound direction consisting of the second contact component 44, third contact component 62, and cushioning rubber 64 is thus provided in the engine mount 10.

The downward facing protrusion 24 in the upper stopper 22 and the protruding end 46 of the second contact component 44 are also positioned facing each other at a distance from each other in the lateral direction (left and right in FIGS. 1 and 6) of the mount orthogonal to the widthwise direction, via the cushioning rubber layer 30 deposited on the rubber elastic body 16 side of the surface of the downward protrusion 24. Thus, a lateral stopper mechanism 72 comprising the downward facing protrusion 24, the second contact component 44 (protruding end 46), and the cushioning rubber layer 30 is thus provided in the engine mount 10.

Both ends in the widthwise direction of the downward facing protrusion 24 in the upper stopper 22 are also positioned apart from each other at a certain distance L1 in the widthwise direction (up and down in FIG. 7) relative to the widthwise contact components 48 in the lower bracket 32 via the cushioning rubber layer 30 deposited on the downward facing protrusion 24. In other words, the downward facing protrusion 24 on which the cushioning rubber layer 30 has been deposited is interposed at a certain interval 2L1 in the plane between the pair of lateral contact components 48, 48 facing each other. Thus, a stopper mechanism 74 in the widthwise direction comprising the downward facing protrusion 24, the pair of widthwise contact components 48, 48, and the cushioning rubber layer 30 is thus provided in the engine mount 10.

In the engine mount 10 in this embodiment, one of the plurality of elastic main axes of the rubber elastic body 16 extends in the direction in which the upper fixture 12 and lower fixture 14 face each other, that is, above the upper fixture 12 or lower fixture 14, which is the direction in which the major vibration load relative to the rubber elastic body 16 is input.

Figure 8:
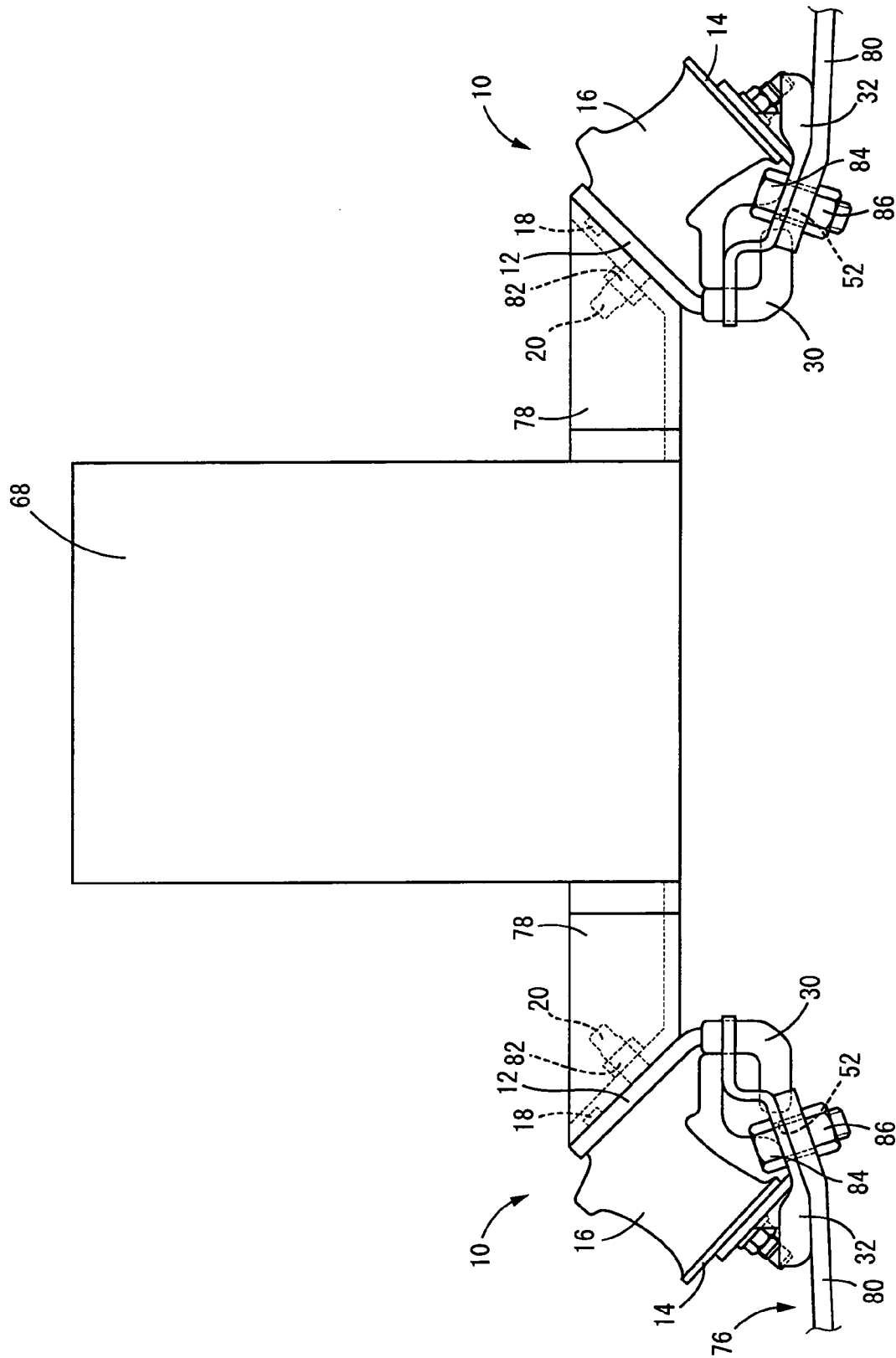
FIG. 8 is a schematic view showing a pair of engine mount of FIG. 1 installed on the vehicle.

As illustrated in FIG. 8, a pair of engine mounts 10 constructed in the manner described above are mounted between the power unit 68 and a vehicle body 76. Namely, while the power unit 68 equipped with an engine, transmission, and the like has an inertia axis extending generally in the torque roll axial direction through its center of gravity, a pair of mounting brackets 78, 78 is fixed to the power unit 68 on both side of the inertia axis, projecting generally in the horizontal direction vertically below the inertia axis. The ends of the mounting brackets 78 are slanted downward on the inside of the power unit 68. Mounting seat surfaces 80 extending generally horizontally at positions corresponding to the ends of the mounting brackets 78 are formed on the vehicle body 76. The upper fixtures 12 of the engine mounts 10 are placed on the ends of the mounting brackets 78 on the power unit 68 side to allow the protrusions 18 of the upper fixtures 12 at the engine mounts 10 to be engaged with the positioning holes formed at certain positions at the ends, and the fixing bolts 20 of the upper fixtures 12 are passed through and screwed into fixing nuts 82. The lower brackets 32 of the engine mounts 10 are placed on the mounting seat surfaces 80 on the body 76 side to allow the protrusions at the certain positions to be engaged at the positioning holes 41 of the lower brackets 32, and fixing bolts 84 are inserted through the fixing holes 52 of the lower brackets 32 and screwed into fixing nuts 86. The pair of engine mounts 10, 10 are thus disposed on both sides of the torque roll axis of the power unit 68, and are mounted between the power unit 68 and vehicle body 76, with the elastic main axis of the rubber elastic body 16, which extends in the direction in which the upper fixture 12 and lower fixture 14 face each other, being tilted upward on the inside of the power unit 68.

With the engine mounts 10 mounted in this way, the support load of the power unit 68 is exerted on the engine mounts 10, so that the rubber elastic body 16 in the state illustrated in FIG. 1 is the elastically deformed from the state illustrated in FIG. 6. That is, in the absence of a vibration load, the second contact component 44 and the first contact component 26 coated with the cushioning rubber layer 30 in the stopper mechanism 66 in the rebound direction are positioned facing each other at a certain distance L2 apart from each other in the vertical direction (up and down in FIGS. and 1 and 8) of the vehicle.

The second contact component 44 and the third contact component 62 coated with the cushioning rubber 64 in the stopper mechanism 70 in the bound direction are positioned facing each other at a certain distance L4 apart from each other in the vertical direction of the vehicle. The protruding end 46 of the second contact component 44 and the downward facing protrusion 24 coated with the cushioning rubber layer 30 in the stopper mechanism 72 in the lateral direction are positioned facing each other at a certain distance L3 apart from each other in the lateral direction (left and right in FIGS. 1 and 8) of the vehicle. The lateral contact components 48 of the second contact component 44 and one each of the two widthwise ends of the downward facing protrusion 24 coated with the cushioning rubber layer 30 in the stopper mechanism 74 in the widthwise direction are positioned facing each other at a certain distance L1 apart from each other in the forward and backward direction (up and down in FIG. 7) of the vehicle.

When mounted, the rebound, bound, lateral, and widthwise stopper mechanisms 66, 70, 72, and 74 are all positioned vertically below the mounting position of the fixing bolts 20 as the bolt fixing positions relative to the power unit 68. The fixing bolts 20 are also located in a position deviating more toward the inside of the power unit than the elastic main axis of the rubber elastic body 16 on the upper fixture 12, so that the upper stopper 22 is bolted to the power unit 68 at a location deviating more toward the inside of the power unit 68 than the location of the elastic main axis.

In this embodiment, as noted above, the pair of fixing holes 52, 52 in the lower brackets 32 are positioned nearer the second contact component 44 than the mounting bolt 54 for fixing the lower fixture 14 and lower brackets 32, so that the lower brackets 32 are bolted to the vehicle body 76 at a position deviating more toward the inside of the power unit 68 than the elastic main axis of the rubber elastic body 16 in the lower fixture 14.

The engine mount 10 with this type of structure is thus equipped with rebound, bound, lateral, and widthwise stopper mechanisms 66, 70, 72, and 74, so that when a certain vibration load in each direction is input between the power unit 68 and the vehicle body 76, that is, between the upper fixture 12 and the lower fixture 14 (lower bracket 32), the pairs of contact components in the stopper mechanisms corresponding to the directions in which the vibration is input come into contact with each other, thereby controlling the relative displacement between the upper fixture 12 and lower fixture 14 in the direction in which the vibration is input. When the pairs of contact components in the various stopper mechanisms come into contact with each other, the impact on the pairs of contact components is absorbed based on the elastic displacement of the cushioning rubber 64 or cushioning rubber layer 30 between the contact components.

In this embodiment, the stopper mechanism 66 in the rebound direction or the stopper mechanism 70 in the bound direction is positioned generally vertically below the mounting position of the fixing bolt 20 by which the upper stopper 22 is fixed to the power unit 68. Thus, the fixing bolt 20 is positioned on the line of action of the force of contact in the rebound direction (up and down in FIG. 1) between the second contact component 44 and the first contact component 26 in the rebound stopper mechanism 66 and on the line of action of the force of contact in the bound direction (up and down in FIG. 1) between the third contact component 62 and the second contact component 44 in the bound stopper mechanism 70. When the pairs of contact components in the stopper mechanisms 66 and 70 come into contact with each other, the moment produced at the bolt fixing position of the upper stopper 22 relative to the power unit 68 is effectively suppressed.

That is, in this embodiment, the areas where the power unit 68 and mounts 10 are fixed are located on the line of action of the force of contact in the direction in which vibration is input between the two contact components of the rebound stopper mechanism 66 and the bound stopper mechanisms 70, to efficiently eliminate problems in preserving the rigidity of the fixing areas which can occur as a result of the moment produced in each direction at the fixing areas due to the plurality of stopper mechanisms corresponding to each direction in which vibration is input. It is thus possible to ensure a better withstanding of a load.

The rebound, bound, lateral, and widthwise stopper mechanisms 66, 70, 72, and 74 are also positioned concentrating on locations deviating further toward the inside of the power unit 68 than the elastic main axis of the rubber elastic body 16 of the lower fixture 14, so that the overall shape is more compact, resulting in more efficient use of space on the vehicle body.

In this embodiment, the lower brackets 32 are bolted to the mounting seating surfaces 80 of the vehicle body 76 at a position deviating more toward the inside of the power unit 68 than the position of the elastic main axis of the rubber elastic body 16 on the lower fixture 14, so that the contact force of the pairs of contact components in the rebound, bound, lateral, and widthwise stopper mechanisms 66, 70, 72, and 74 is efficiently transmitted to the fixing areas, with more effectively suppressed moment around the fixing areas when the pairs of contact components come into contact with each other.

In this embodiment, the upper fixture 12 and lower fixture 14 (lower bracket 32) are fixed relative to the power unit 68 and vehicle body 76 at positions near the stopper mechanisms, resulting in greater support rigidity. The natural frequency of the upper fixture 12 and lower fixture 14 can thus be set to a sufficiently high frequency spectrum, to attenuate or avoid any worsening vibration as a result of resonance and thus achieve better vibration-proof effects.

In this embodiment, a cushioning rubber layer 30 is formed along the entire first contact component 26 in the upper stopper 22. The resulting uniform cushioning rubber on the rebound, lateral, and widthwise stopper mechanisms 66, 72, and 74 is thus easier to manufacture.

While the presently preferred embodiment of this invention have been described in detail, for illustrative purpose only, it is to be understood that the present invention is not limited to the details of the illustrated embodiments, but may be otherwise embodied with various other changes, modifications and improvements, which may occur to those skilled in the art, without departing from the spirit and scope of the invention defined in the following claims.

For example, the lower fixture and lower bracket were separately formed in the above embodiment, but the may be integrally formed so that the lower stopper is integrally provided on the lower fixture.

Figure 9:
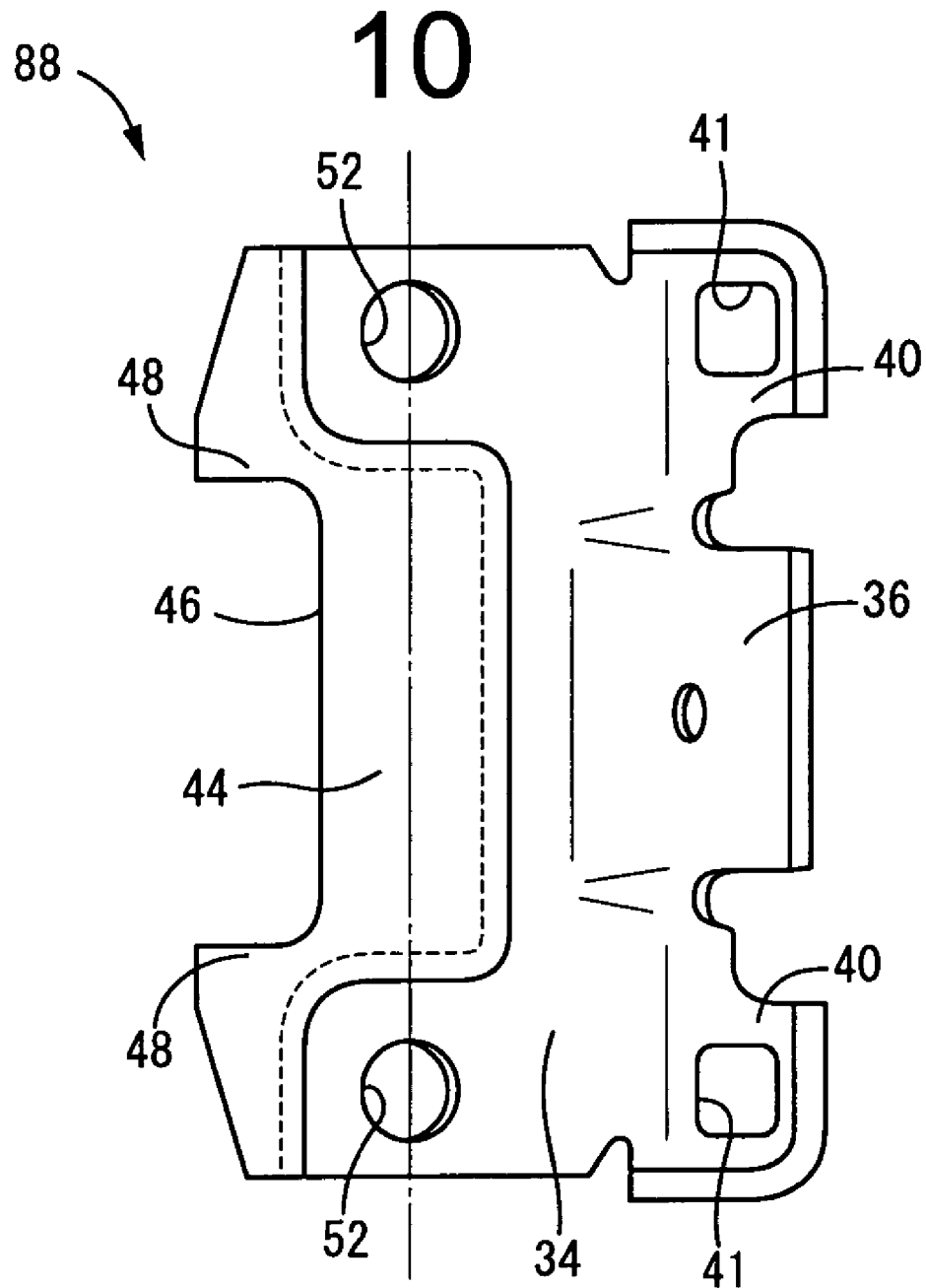
FIG. 9 is a top plane view of an example of a lower bracket used in the engine mount of FIG. 1.

The lower bracket is also not limited to the one shown in the embodiment. Specifically, a lower bracket 88 can be used, wherein as illustrated in FIG. 9, for example, the fixing holes 52 are provided in the floor wall 34 on both sides in the lateral direction of the second contact component 44, and are disposed on generally the same line 10—10 in the widthwise direction as the second contact component 44. Parts and areas of the lower bracket 88 in this specific example having substantially the same structure as the above embodiment are indicated by the same numerals in FIG. 9 and redundant explanations for those parts will be omitted.

The upper stopper may also be formed separately from the upper fixture, and may be placed closely on the external surface of the upper fixture and fixed with a bolt or the like.

Since integrally forming both the upper stopper with the upper fixture and the lower bracket with the lower fixture will make the vulcanization mold structure for the rubber elastic body more complicated and will make the mold more complicated to open and close, it is thus more desirable to form at least one of these sets separately.

In the above embodiment, a pair of engine mounts are disposed on the automobile on both sides of the torque roll axis of the power unit, but of course one or a plurality of mounts can be set up in appropriate locations.

While the present invention is applied to a specific example of a solid type of engine mount in the invention in which the power unit and the vehicle body are elastically joined by a rubber elastic body installed between the power unit and vehicle body, but the invention is not limited to the illustrated embodiment. The present invention is similarly applicable to fluid-filled type engine mounts and various other types of engine mounts, as well.

What is claimed is:

1. An engine mount comprising:
an upper mounting plate fixture adapted to be fixed to a power unit;
a lower mounting plate fixture disposed facing to the upper mounting plate fixture at a distance from each other, and adapted to be fixed to a vehicle body;
a rubber elastic body disposed between and elastically connecting the upper and lower mounting plate fixtures,
the engine mount adapted to be disposed on either side of a torque roll axis of the power unit with the upper and lower mounting plate fixtures respectively fixed to the power unit and vehicle body so that an elastic main axis of the rubber elastic body is disposed at an incline slanting upward toward an inside of the power unit;
an upper stopper formed by being integrally formed with the upper mounting plate fixture or by fixing a separate fixture to the upper mounting plate fixture such that a downward facing protrusion is provided protruding downward on a side of the power unit from the upper mounting plate fixture, and a distal end of the downward facing protrusion is bent into an L-shape, so as to provide a first contact component extending generally horizontally toward the rubber elastic body;
a lower stopper formed by being integrally formed with the lower mounting plate fixture or by fixing a separate fixture to the lower mounting plate fixture such that an upward facing protrusion is provided protruding upward on the side of the power unit from the lower mounting plate fixture, and a distal end of the upward facing protrusion is bent into an L-shape, so as to provide a second contact component extending generally horizontally toward a side opposite the rubber elastic body, whereby the first contact component is thrust into the bottom of the second contact component so that the first and second contact components are positioned facing each other at a distance from each other generally in a vertical direction; and
a cushioning rubber formed on at least one of the first and second contact components to form a stopper mechanism in a rebound direction,
wherein the upper stopper is bolted to the power unit at a position deviating more toward the inside of the power unit than a position of the elastic main axis of the rubber elastic body on the upper mounting plate fixture so that the stopper mechanism in the rebound direction is positioned generally vertically below the position where the upper stopper is bolted to the power unit, and wherein the lower stopper is bolted to the vehicle body at a position deviating more toward the inside of the power unit than the position of the elastic main axis of the rubber elastic body on the lower mounting plate fixture.

2. An engine mount according to claim 1, wherein the upward facing protrusion in the lower stopper is bent toward the inside of the power unit on both sides in a widthwise direction of the first contact component in the upper stopper, so as to integrally form vertical walls joining the upward facing protrusion in the lower stopper with both edges of the second contact component in a widthwise direction, providing a generally pocket-shaped structure opening downward formed overall by the upward facing protrusion, second contact component, and the vertical walls on the both sides.

3. An engine mount according to claim 1, wherein the second contact component in the lower stopper is located in a position apart from and facing a surface of the downward facing protrusion of the upper stopper on a side of the rubber elastic body, at a protruding end surface thereof, and a cushioning rubber is formed on at least one of the surfaces facing each other, forming a lateral stopper mechanism; and the second contact component in the lower stopper protrudes toward the side opposite the rubber elastic body on both sides in the lateral direction of the downward facing protrusion in the upper stopper, integrally forming a pair of contact components in the widthwise direction located apart from and facing outward in the widthwise direction relative to both end surfaces in the widthwise direction of the downward facing protrusion in the upper stopper, a cushioning rubber being formed on at least one of the facing surfaces so as to form a stopper mechanism in the widthwise direction.

4. An engine mount according to claim 1, wherein a third contact component is formed in the upper mounting plate fixture at a distance facing, from above, the second contact component in the lower stopper, and a cushioning rubber is formed on at least one facing surface of the second contact component or third contact component, forming a stopper mechanism in a bound direction.

5. An engine mount according to claim 4, wherein the third contact component is formed by utilizing a retainer fixture of generally rectangular flat plate that is embedded within the rubber elastic body and tilted at a certain distance so as to extend generally parallel to the upper mounting plate fixture in a plane between the upper and lower mounting plate fixtures facing each other, the retainer fixture being fixed to the upper mounting plate fixture.

6. An engine mount according to claim 1, wherein the upper mounting plate fixture is extended toward the inside of the power unit so that the upper stopper is integrally formed with the upper mounting plate fixture; a bolt fixing the upper mounting plate fixture to the power unit is set up deviating more toward the inside of the power unit than the elastic main axis of the rubber elastic body, whereas the lower stopper is formed by bolting a separate fixture to the lower mounting plate fixture; and the lower stopper is bolted to the vehicle body at a location nearer the second contact component than the position where the lower mounting plate fixture is bolted in the lower stopper.

7. An engine mount according to claim 1, wherein the lower stopper is bolted at a plurality of portions to the vehicle body and the plurality of portions are on both sides of the second contact component in the widthwise direction.

8. An engine mount according to claim 7, wherein the positions where the lower stopper is bolted to the vehicle body are disposed on generally a same line in the widthwise direction of the second contact component.

* * * * *